United States Patent
Wang et al.

(10) Patent No.: US 12,436,324 B2
(45) Date of Patent: Oct. 7, 2025

(54) TRANSMITTER HAVING A LIGHT MODULATOR FOR LIGHT DETECTION AND RANGING (LiDAR)

(71) Applicant: GUANGZHOU WOYA LAIDELING TECHNOLOGY CO., LTD., Guangzhou (CN)

(72) Inventors: Youmin Wang, Berkeley, CA (US); Yonghong Guo, Mountain View, CA (US); Chao Wang, Milpitas, CA (US); Yue Lu, Los Gatos, CA (US); Lingkai Kong, Palo Alto, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1114 days.

(21) Appl. No.: 17/381,076

(22) Filed: Jul. 20, 2021

(65) Prior Publication Data

US 2021/0349244 A1    Nov. 11, 2021

Related U.S. Application Data

(62) Division of application No. 16/212,631, filed on Dec. 6, 2018, now Pat. No. 11,086,058.

(51) Int. Cl.
    *G02B 5/18*      (2006.01)
    *G01S 17/02*    (2020.01)
    *G02B 27/10*    (2006.01)

(52) U.S. Cl.
    CPC .......... *G02B 5/1823* (2013.01); *G01S 17/02* (2013.01); *G02B 27/1086* (2013.01)

(58) Field of Classification Search
None
See application file for complete search history.

(56) References Cited

U.S. PATENT DOCUMENTS

| | | | |
|---|---|---|---|
| 4,915,463 A * | 4/1990 | Barbee, Jr. | G02B 5/1838 |
| | | | 359/360 |
| 6,356,577 B1 | 3/2002 | Miller | |
| 2004/0252743 A1 | 12/2004 | Anikitchev et al. | |

(Continued)

FOREIGN PATENT DOCUMENTS

| CN | 102868089 A | 1/2013 |
|---|---|---|
| CN | 108321677 A | 7/2018 |

OTHER PUBLICATIONS

International Search Report issued in corresponding International Application No. PCT/US2018/067569, mailed Apr. 8, 2019, 5 pages.

(Continued)

*Primary Examiner* — Stephone B Allen
*Assistant Examiner* — Jyotsna V Dabbi
(74) *Attorney, Agent, or Firm* — BAYES PLLC

(57) ABSTRACT

A transmitter for light detection and ranging (LiDAR) is provided. The transmitter includes a plurality of laser sources and a light modulator. Each of the laser sources includes interleaved emitting regions and gaps and is configured to provide a native laser beam in a respective incident direction. The light modulator is configured to receive the native laser beams from the plurality of laser sources in different incident directions and combine the native laser beams into a combined laser beam in a diffraction direction.

20 Claims, 7 Drawing Sheets

(56) References Cited

U.S. PATENT DOCUMENTS

| | | |
|---|---|---|
| 2006/0013277 A1 | 1/2006 | Fuse |
| 2007/0291813 A1 | 12/2007 | Hu et al. |
| 2011/0103056 A1 | 5/2011 | Wolak et al. |
| 2011/0216792 A1 | 9/2011 | Chann et al. |
| 2015/0036218 A1 | 2/2015 | Rothenberg |
| 2015/0303656 A1 | 10/2015 | Morita et al. |
| 2015/0355403 A1 | 12/2015 | Santori et al. |
| 2019/0369254 A1* | 12/2019 | Dumais .................. G02F 1/292 |

OTHER PUBLICATIONS

Written Opinion of the International Searching Authority issued in corresponding International Application No. PCT/US2018/067569, mailed Apr. 8, 2019, 7 pages.

* cited by examiner

600

TRANSMITTER HAVING A LIGHT MODULATOR FOR LIGHT DETECTION AND RANGING (LiDAR)

CROSS-REFERENCE TO RELATED APPLICATIONS

The present application is a division of U.S. patent application Ser. No. 16/212,631, filed on Dec. 6, 2018, entitled "TRANSMITTER HAVING A LIGHT MODULATOR FOR LIGHT DETECTION AND RANGING (LIDAR), the entire content of which is incorporated herein by reference.

TECHNICAL FIELD

The present disclosure relates to a Light Detection and Ranging (LiDAR) system, and more particularly to, a transmitter having a light modulator for LiDAR.

BACKGROUND

LiDAR systems have been widely used in autonomous driving and producing high-definition maps. For example, LiDAR systems measure distance to a target by illuminating the target with pulsed laser light and ensuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

A LiDAR transmitter usually requires combining power from multiple laser diodes to meet the output power requirement. To reduce the number of laser diodes that are needed, multi junction laser diodes can be used. However, the multi junction laser diodes usually have gaps in between the emitting regions, thereby reducing the overall power density for the output beam.

Embodiments of the disclosure address the above problems by an improved transmitter having a light modulator for LiDAR.

SUMMARY

Embodiments of the disclosure provide a transmitter for LiDAR. The transmitter includes a plurality of laser sources and a light modulator. Each of the laser sources includes interleaved emitting regions and gaps and is configured to provide a native laser beam in a respective incident direction. The light modulator is configured to receive the native laser beams from the plurality of laser sources in different incident directions and combine the native laser beams into a combined laser beam in a diffraction direction.

Embodiments of the disclosure also provide another transmitter for LiDAR. The transmitter includes a first multi junction pulsed laser diode (PLD), a second multi junction PLD, and a light modulator. The first multi junction PLD is configured to provide a first native laser beam in a first incident direction. The second multi junction PLD is configured to provide a second native laser beam in a second incident direction perpendicular to the first incident direction. The light modulator includes a transparent substrate and a plurality of light reflection elements on the transparent substrate spaced apart in a pitch and configured to selectively pass and reflect each of the first and second native laser beams such that far-field spots of a combined laser beam comprise interleaved light from each of the first and second multi junction PLDs.

Embodiments of the disclosure also provide a transmitter for LiDAR. The transmitter includes at least three multi junction PLDs and a light modulator. Each of the at least three multi junction PLDs is configured to provide a native laser beam in a respective incident direction. The light modulator includes a transparent substrate, and a diffractive optical element (DOE) layer on the transparent substrate and comprising at least three interleaved patterns configured to selectively pass and reflect each of the at least three native laser beams such that far-field spots of a combined laser beam comprise interleaved light from each of the at least three multi junction PLDs.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
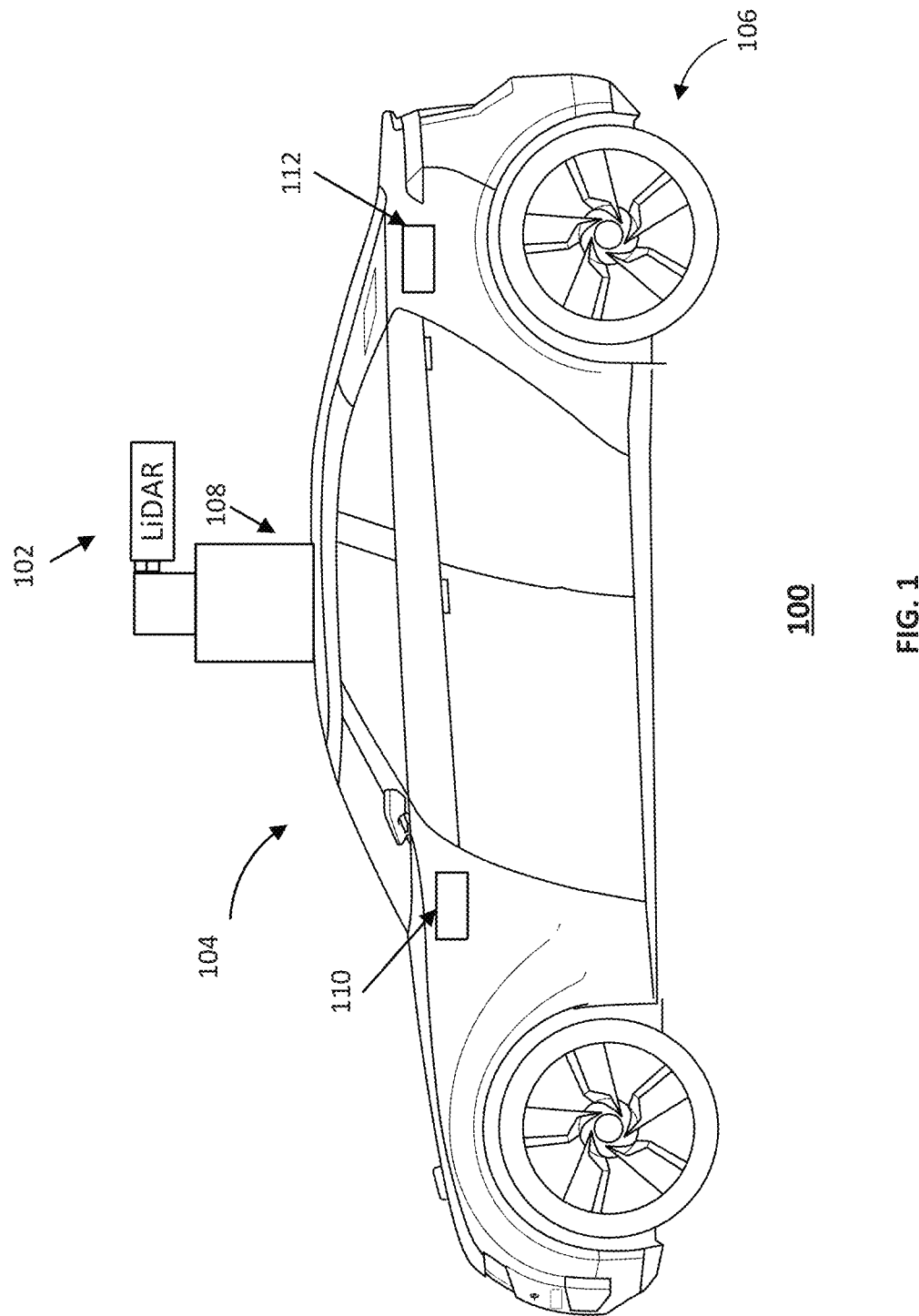
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling. It is contemplated that vehicle 100 may be an electric vehicle, a fuel cell vehicle, a hybrid vehicle, or a conventional internal combustion engine vehicle. Vehicle 100 may have a body 104 and at least one wheel 106. Body 104 may be any body style, such as a sports vehicle, a coupe, a sedan, a pick-up truck, a station wagon, a sports utility vehicle (SUV), a minivan, or a conversion van. In some embodiments of the present disclosure, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments of the present disclosure, vehicle 100 may be configured to be operated by an operator occupying the vehicle, remotely controlled, and/or autonomous.

As illustrated in FIG. 1, vehicle 100 may be equipped with LiDAR system 102 mounted to body 104 via a mounting structure 108. Mounting structure 108 may be an electromechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser light and measuring the reflected pulses with a receiver. The laser light used for LiDAR system 102 may be ultraviolet-, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

As illustrated in FIG. 1, vehicle 100 may be additionally equipped with sensor 110, which may include sensors used in a navigation unit, such as a Global Positioning System (GPS) receiver and one or more Inertial Measurement Unit (IMU) sensors. By combining the GPS receiver and the IMU sensor, sensor 110 can provide real-time pose information of vehicle 100 as it travels, including the positions and orientations (e.g., Euler angles) of vehicle 100 at each time stamp. In some embodiments of the present disclosure, pose information may be used for calibration and/or pretreatment of the point cloud data captured by LiDAR system 102.

Consistent with the present disclosure, vehicle 100 may include a local controller 112 inside body 104 of vehicle 100 or communicate with a remote computing device, such as a server, (not illustrated in FIG. 1) for controlling the operations of LiDAR system 102 and sensor 110. In some embodiments of the present disclosure, controller 112 may have different modules in a single device, such as an integrated circuit (IC) chip (implemented as an application-specific integrated circuit (ASIC) or a field-programmable gate array (FPGA)), or separate devices with dedicated functions. In some embodiments of the present disclosure, one or more components of controller 112 may be located inside vehicle 100 or may be alternatively in a mobile device, in the cloud, or another remote location. Components of controller 112 may be in an integrated device or distributed at different locations but communicate with each other through a network (not shown).

Figure 2:
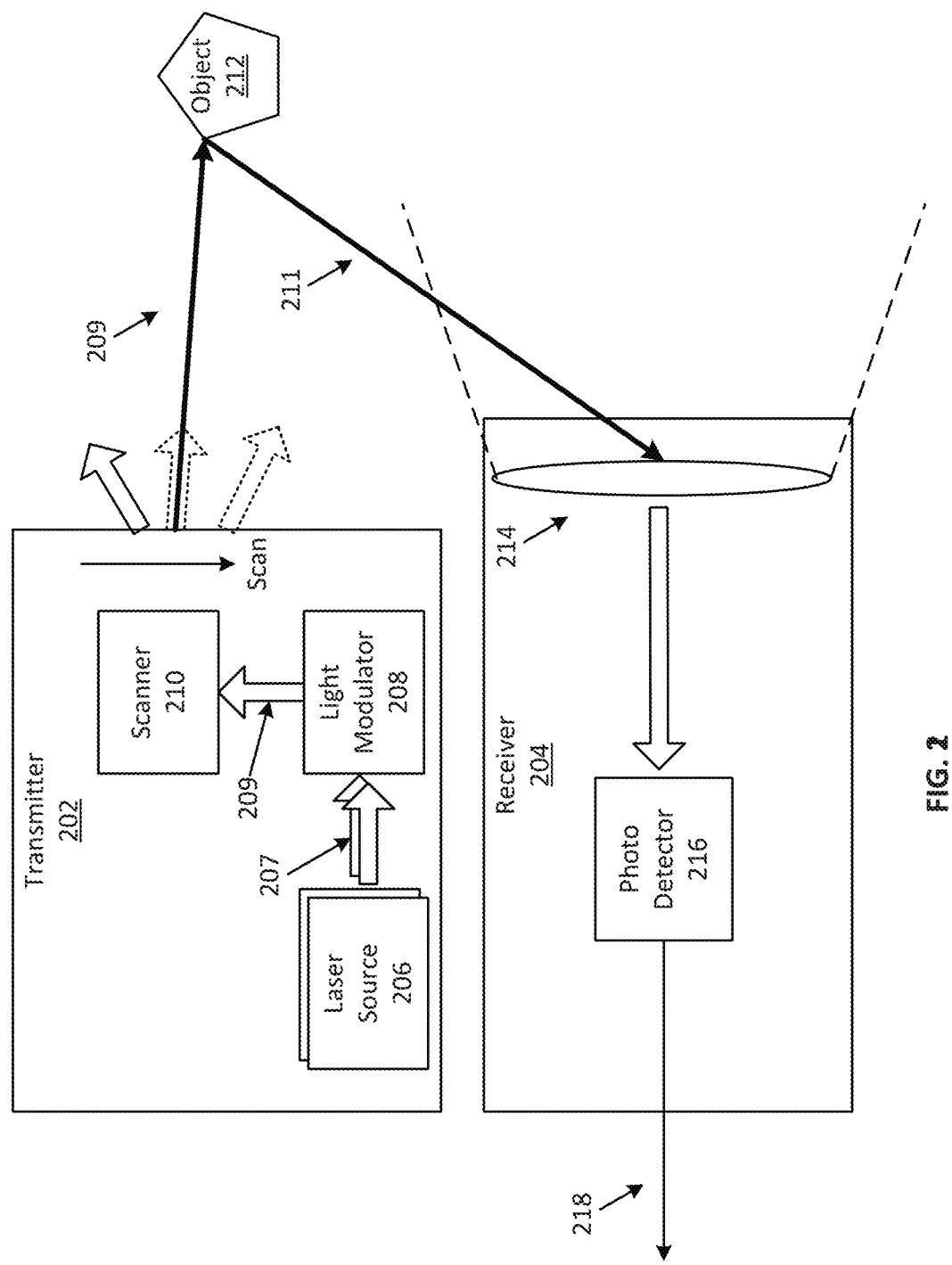
FIG. 2 illustrates a block diagram of an exemplary LiDAR system having a transmitter with a light modulator, according to embodiments of the disclosure.

FIG. 2 illustrates a block diagram of an exemplary LiDAR system 102 having a transmitter 202 with a light modulator 208, according to embodiments of the disclosure. LiDAR system 102 may include transmitter 202 and a receiver 204. Transmitter 202 may emit laser beams within a scan angle. Transmitter 202 may include a plurality of laser sources 206, light modulator 208, and a scanner 210. Consistent with the disclosure of the present application, light modulator 208 can be included in transmitter 202 to spatially combine multiple native laser beams provided by multiple laser sources 206 into a single combined laser beam and minimize the gaps of light in the combined laser beam based on interleaved multiplexing.

As described below in detail, light modulator 208 can interleave the corresponding locations from different laser sources 206 with different incident directions to cover each other's gap regions equivalently in the final combined laser beam having the same optical path, thereby enhancing the overall power density of the output beam. The laser beams from multiple laser sources 206 can be combined without increasing the laser beam diameter or the beam propagation product (BPP) and thus, can be easily collimated onto the transmitter aperture of LiDAR system 102.

As part of LiDAR system 102, transmitter 202 can sequentially emit a stream of pulsed laser beams in different directions within its scan angle, as illustrated in FIG. 2. Each of multiple laser sources 206 may be configured to provide a laser beam 207 (referred to herein as "native laser beams") in a respective incident direction to light modulator 208. In some embodiments of the present disclosure, each laser source 206 may generate a pulsed laser beam in the ultraviolet, visible, or ea infrared wavelength range.

In some embodiments of the present disclosure, each of laser sources 206 is a PLD. A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the Wavelength of native laser beam 207 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, or 848 nm.

Figure 3:
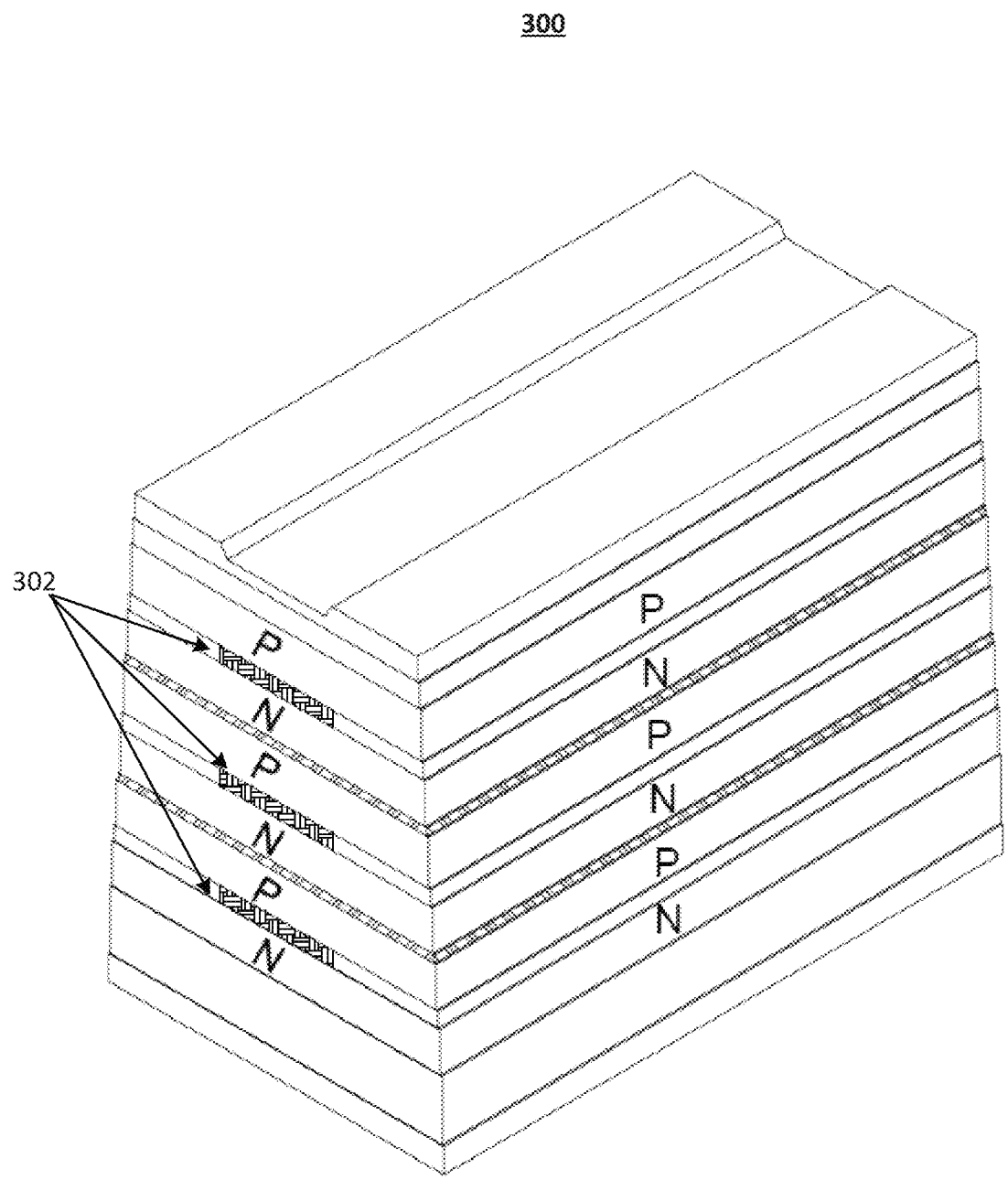
FIG. 3 illustrates a top perspective view of an exemplary multi junction PLD, according to embodiments of the disclosure.

In some embodiments of the present disclosure, each of laser sources 206 is a multi junction PLD. A multi junction PLD stacks multiple emitting junction areas into one laser diode. Ideally, the number of PLDs to be used to combine power into a higher power beam should be limited, to ease the alignment efforts and minimize assembly costs. This leads to the use of multi junction PLDs as illustrated in FIG. 3. Multi junction PLD 300 illustrated in FIG. 3 includes a plurality of emitting regions 302 each of which is within one of multiple emitting PN diodes/junctions and can emit light. In some embodiments, emitting regions 302 may be equally spaced apart by gaps in a pitch, such as 5 µm. Light cannot be emitted from the gaps between emitting regions 302, which are reserved because of thermal control and process limitations. In other words, a multi junction PLD 300 may include interleaved emitting regions 302 and gaps.

Referring back to FIG. 2, in some embodiments, each laser source 206 is a multi-junction PLD 300 having interleaved emitting regions and gaps. This interleaved emitting configuration, however, lowers the output beam's spatial power density, while having the same BPP. As used in the present disclosure, BPP is the product of the system aperture size and the output beam divergence angle. In a small aperture LiDAR system, output beam divergence is fundamentally limited by BPP, which is dependent on the system aperture size, and the divergence angle of laser source 206. As described below in detail, laser sources 206 may include two laser sources 206 that are arranged perpendicular to one another or three or more laser sources 206 that are arranged in any arbitrary angles with respect to one another depending on the specific configuration of light modulator 208 used in transmitter 202.

Light modulator 208 may be configured to receive native laser beams 207 from laser sources 206 in different incident directions and combine native laser beams 207 into a combined laser beam 209 in a diffraction direction. In some embodiments of the present disclosure, light modulator 208 includes a plurality of transmissive regions and reflective regions configured to selectively pass and reflect each native laser beam 207 such that far-field spots of combined laser beam 209 include interleaved light from each laser source 206.

Figure 4:
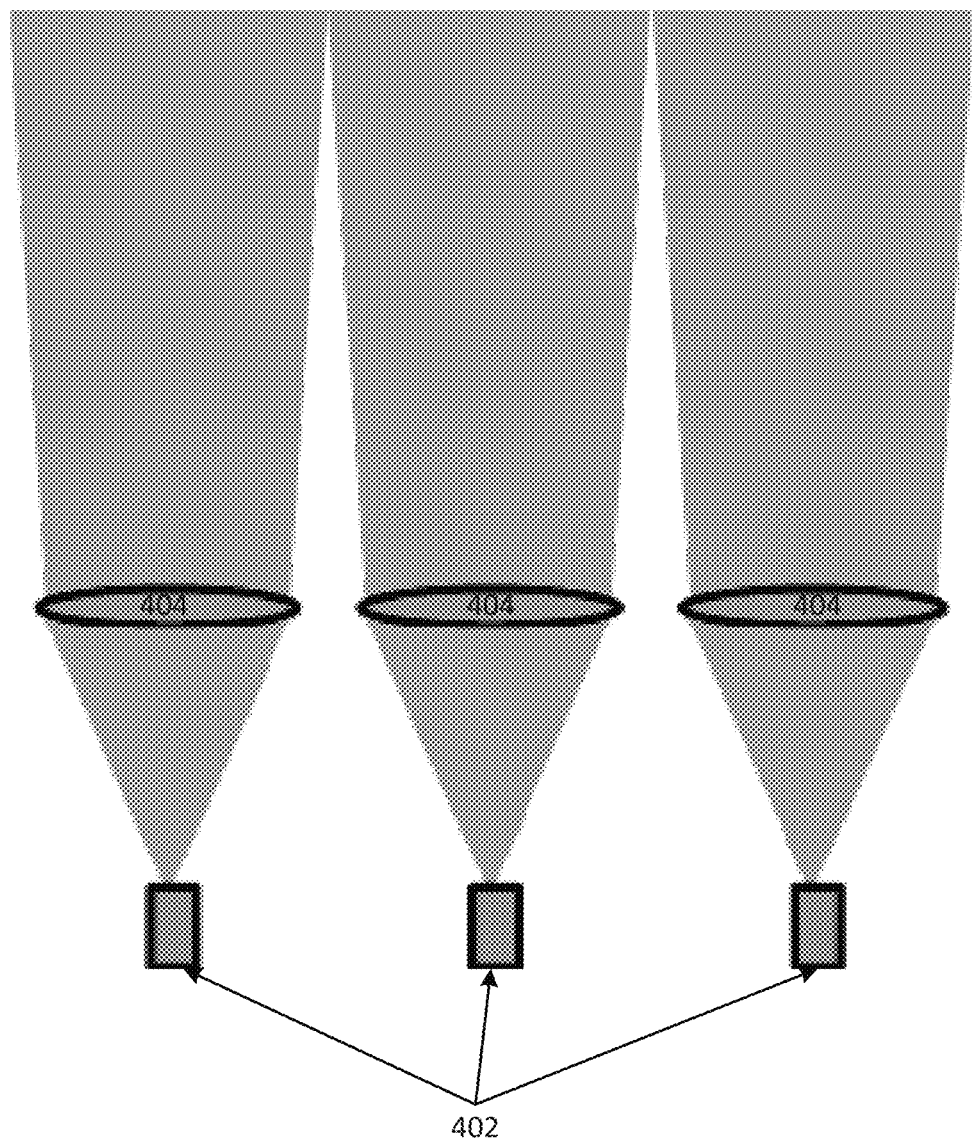
FIG. 4 illustrates a schematic diagram of an exemplary transmitter for LiDAR without a light modulator.

To better illustrate the functions of light modulator 208, FIG. 4 illustrates a schematic diagram of an exemplary transmitter 400 for LiDAR without a light modulator. Transmitter 400 includes a plurality of multi junction PLDs 402 and collimators 404, but not a light modulator. Each multi junction PLD 402 is arranged substantially parallel to one another and includes interleaved emitting regions and gaps. Light in a light beam from each multi-junction PLD 402 is projected by respective collimator 404, such as a fast axis collimator (FAC), to make them substantially parallel to another. The different light beams from multiple multi-junction PLDs 402 projected by collimators 404 as thus multiplexed into a single combined laser beam. The gaps between the emitting regions of each multi junction PLD 402 still cause gaps existing in the combined laser beam, which reduces the output light density. Moreover, the diameter and BPP of the combined laser beam is increased from those of individual laser beams provided by multi junction PLDs 402.

Figure 5A:
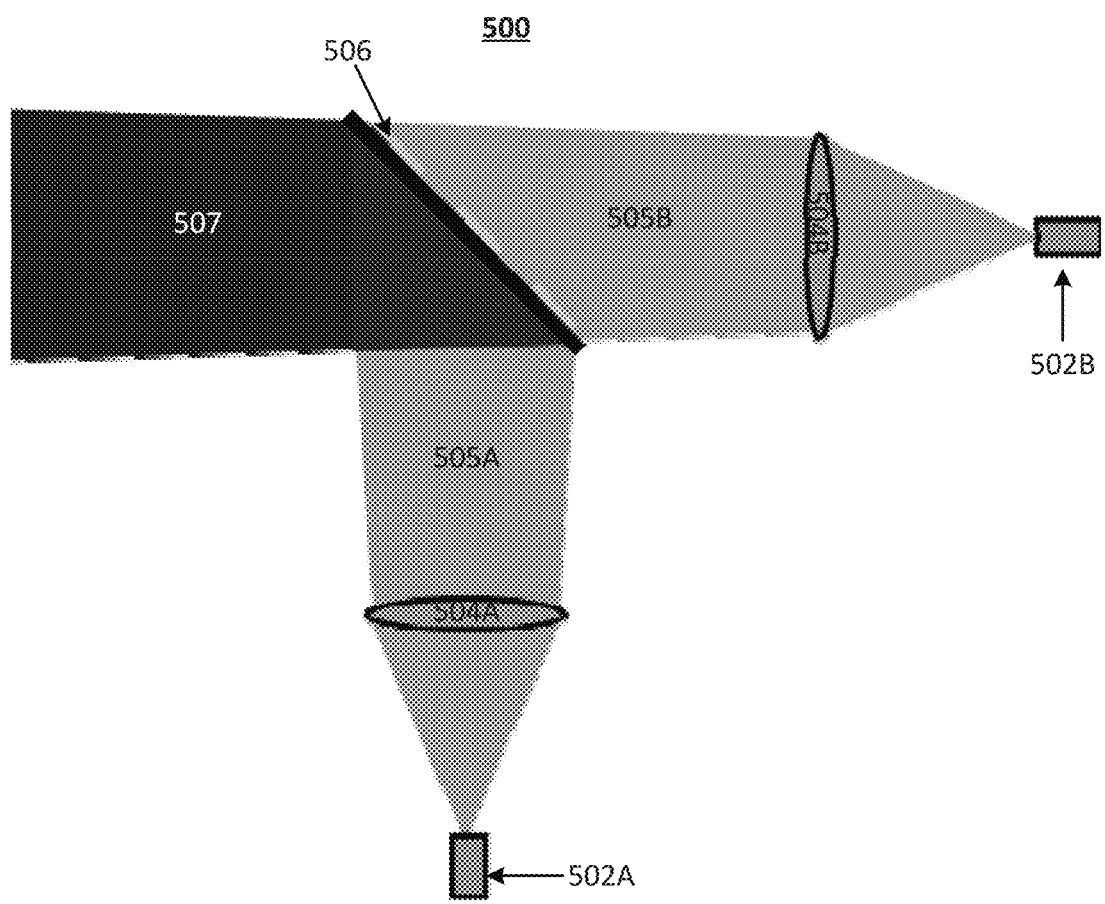
FIG. 5A illustrates a schematic diagram of an exemplary transmitter for LiDAR with a light modulator, according to embodiments of the disclosure.

In contrast, FIG. 5A illustrates a schematic diagram of an exemplary transmitter 500 for LiDAR with a light modulator, according to embodiments of the disclosure. Transmitter 500 may include a first laser source 502A, a second laser source 502B, a first collimator 504A, a second collimator 504B, and a light modulator 506. In some embodiments of the present disclosure, each of first and second laser sources 502A and 502B includes interleaved emitting regions and gaps. For example, each of first and second laser sources 502A and 502B may be a multi junction PLD as shown in FIG. 3. Each of first and second collimators 504A and 504B may be a FAC that includes one or more aspheric cylindrical lenses and configured to project light from the emitting regions of a respective laser source 502A or 502B into a respective incident direction with gaps inbetween. For example, first collimators 504A may be configured to project the light from the emitting regions of first layer source 502A into a first native laser beam 505A in a first incident direction with gaps in between the light. Similarly, second collimators 504B may be configured to project the light from the emitting regions of second layer source 502B into a second native laser beam 505B in a second incident direction with gaps inbetween the light. In some embodiments of the present disclosure, first and second laser sources 502A and 502B are arranged perpendicular to one another, so are first and second collimators 504A and 504B, such that the first and second incident directions of first and second native laser beams 505A and 505B are perpendicular to one another.

Light modulator 506 may be arranged 45° off from each of first and second laser sources 502A and 502B and the first and second incident directions thereof. It is understood that in some embodiments, the angle may be changed to other values, which can be multiples of 45° (e.g., 90°) or any other suitable values that are not multiples of 45°. Consistent with the present disclosure, light modulator 506 may be configured to receive first and second native laser beams 505A and 505B from first and second laser sources 502A and 502B in the first and second incident directions, respectively, and combine first and second native laser beams 505A and 505B into a combined laser beam 507 in a diffraction direction. In some embodiments of the present disclosure, light modulator 506 includes a plurality of transmissive regions and reflective regions configured to selectively pass and reflect each of first and second native laser beams 505A and 505B, such that far-field spots of combined laser beam 507 includes interleaved light from each of first and second laser sources 502A and 502B. In some embodiments, the transmissive regions and reflective regions are interleaved. The transmissive regions and reflective regions of light modulator 506 may match the fill factors of first and second laser sources 502A and 502B in order to have light from first native laser beam 505A to cover the gaps in second native laser beam 505B and vice versa, thereby minimizing the gaps in combined laser beam 507 without increasing the diameter and/or BPP of combined laser beam 507. In some embodiments of the present disclosure, a diameter of combined laser beam 507 is not greater than diameters of each of first and second native laser beams 505A and 505B. In some embodiments of the present disclosure, BPP of combined laser beam 507 is not greater than BPP of each of first and second native laser beams 505A and 505B.

Figure 6:
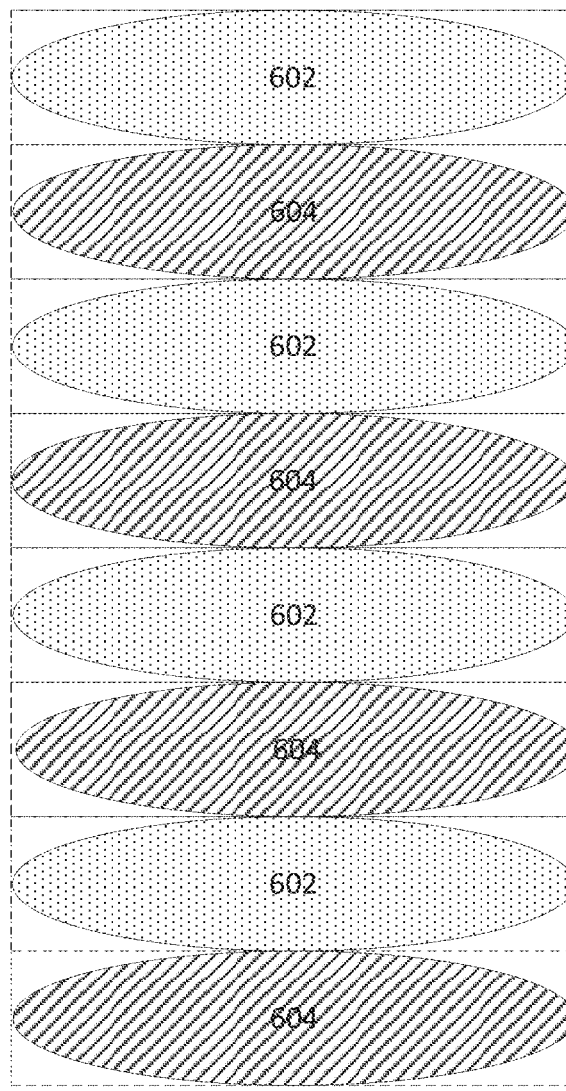
FIG. 6 illustrates exemplary far-field spots of a combined laser beam, according to embodiments of the disclosure.

For example, FIG. 6 illustrates an exemplary far-field spots 600 of a combined laser beam, according to embodiments of the disclosure. In optics, far-field is the region farther away from a source or aperture that is closer than the Rayleigh length. In some embodiments, far-field is defined by the Fraunhofer distance, $d=2 \times D^2/\text{lambda}$, where D is the aperture size (e.g., the laser diode's width and length), and lambda is the wavelength. Far-field spots 600 of a laser beam combined by a modulator (e.g., combined laser beam 507) may include interleaved light 602 from first laser source 502A and light 604 from second laser source 502B. Interleaved light 602 and light 604 may be arranged in a pitch. By selectively pass and reflect each of first and second native laser beams 505A and 505B, gaps in first and second native laser beams 505A and 505B can be covered by one another because of their angle difference, thereby minimizing the gaps in the combined laser beam and far-field spots 600 thereof. In some embodiments of the present disclosure, the gaps in the combined laser beam and far-field spots 600 may be eliminated, and interleaved light 602 and light 604 interface or overlap, which increases the combined laser beam's power density, while not increasing the combined laser beam's diameter and/or BPP compared with each of the native laser beams (e.g., first and second native laser beams 505A and 505B).

Figure 5B:
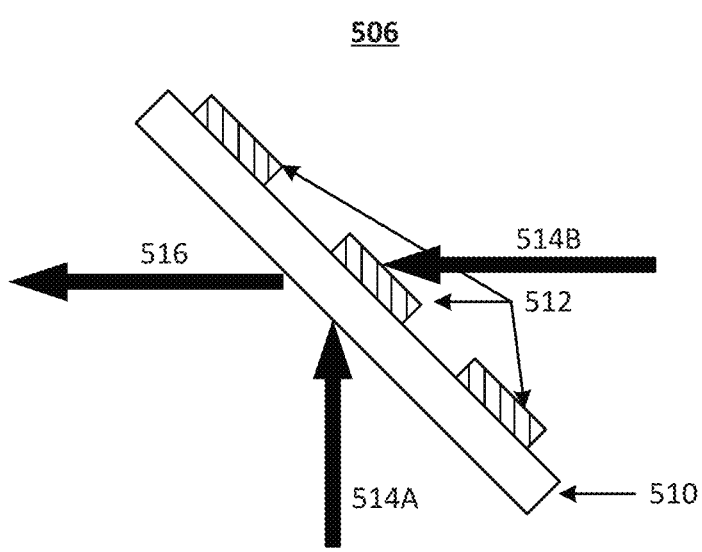
FIG. 5B illustrates a schematic diagram of an exemplary light modulator in the transmitter of FIG. 5A, according to embodiments of the disclosure.

FIG. 5B illustrates a schematic diagram of an exemplary light modulator 506 in transmitter 500 of FIG. 5A, according to embodiments of the disclosure. As shown in FIG. 5B, light modulator 506 may include a transparent substrate 510 and a plurality of light reflection elements 512 on transparent substrate 510 spaced apart in a pitch. Light modulator 506 may be arranged in a way such that the first incident angle between first incident direction 514A and transparent substrate 510 is 45°, and the second incident angle between second incident direction 514B and transparent substrate 510 is 45° as well. A diffraction direction 516 may be parallel to second incident direction 514B (i.e., the second diffraction angle being 0°) and perpendicular to first incident direction 514A (i.e., the first diffraction angle being 90° or 270°).

Transparent substrate 510 may be transparent to the wavelengths of each of first and second native laser beams 505A and 505B, i.e., allowing the light to pass through. In some embodiments of the present disclosure, transparent substrate 510 is made of materials including, but not limited to, glass, quartz, and plastic. Multiple light reflection elements 512 may be arranged on the same main surface of transparent substrate to reflect light on its reflective surface. In some embodiments of the present disclosure, multiple light reflection elements 512 are spaced part in a same pitch. The pitch of light reflection elements 512 may determine the pitch of interleaved light from different laser sources in the far-field spots of the combined laser beam (e.g., the pitch of interleaved light 602 and 604 in far-field spots 600 in FIG. 6). In some embodiments of the present disclosure, each light reflection element 512 may be coated with one or more material layers on its top surface that can reflect light in first and second native laser beams 505A and 505B, such as metal layers (e.g., silver or aluminum). Light reflection elements 512 thus become the reflective regions of light modulator 506, and the remaining regions of transparent substrate 510 that are not covered by light reflection elements 512 become the transmissive regions of light modulator 506.

Figure 7A:
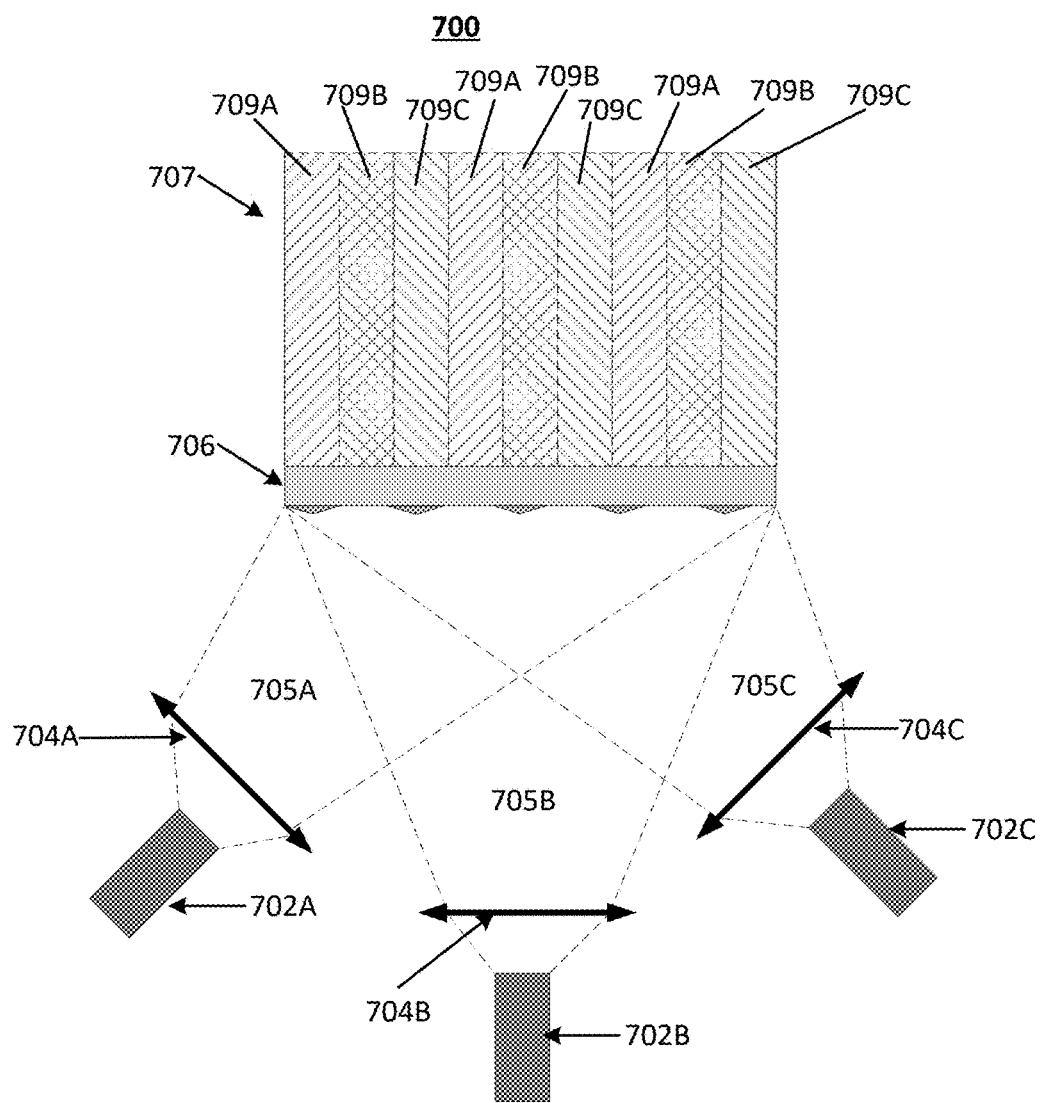
FIG. 7A illustrates a schematic diagram of another exemplary transmitter for LiDAR with a light modulator, according to embodiments of the disclosure.

FIG. 7A illustrates a schematic diagram of another exemplary transmitter 700 for LiDAR with a light modulator 706, according to embodiments of the disclosure. Transmitter 700 may include a first laser source 702A, a second laser source 702B, a third laser source 702C, a first collimator 704A, a second collimator 704B, a third collimator 704C, and a light modulator 706. In some embodiments of the present disclosure, each of first, second, and third laser sources 702A-702C includes interleaved emitting regions and gaps. For example, each of first, second, and third laser sources 702A-702C may be a multi junction PLD as shown in FIG. 3. Each of first, second, and third collimators 704A-704C may be a FAC that includes one or more aspheric cylindrical lenses and configured to project light from the emitting regions of a respective laser source 702A, 702B, or 702C into a respective incident direction with gaps inbetween. Different from those of transmitter 500 in FIG. 5A, first, second, and third laser sources 702A-702C of transmitter 700 in FIG. 7A can be arranged in any arbitrary angles with respect to one another, such that the incident directions of first, second, and third native laser beams 705A-705C can be in any arbitrary angles with respect to one another.

Light modulator 706 may be arranged in any suitable angle from each of first, second, and third laser sources 702A-702C and the incident directions thereof. Consistent with the present disclosure, light modulator 706 may be configured to receive first, second, and third native laser beams 705A-705C from first, second, and third laser sources 702A-702C, respectively, and combine first, second, and third native laser beams 705A-705C into a combined laser beam 707 in a diffraction direction. In some embodiments of the present disclosure, light modulator 706 includes a plurality of transmissive regions and reflective regions configured to selectively pass and reflect each of first, second, and third native laser beams 705A-705C, such that far-field spots of combined laser beam 707 includes interleaved light from each of first, second, and third laser sources 702A-702C. In some embodiments, the transmissive regions and reflective regions are interleaved. The transmissive regions and reflective regions of light modulator 706 may match the fill factors of first, second, and third laser sources 702A-702C in order to have gaps in any one of three native laser beams 705A-705C to be covered by the light in other two native laser beams, thereby minimizing the gaps in combined laser beam 707 without increasing the diameter and/or BPP of combined laser beam 707. In some embodiments of the present disclosure, a diameter of combined laser beam 707 is not greater than the diameter of each of first, second, and third native laser beams 705A-705C. In some embodiments of the present disclosure, BPP of combined laser beam 707 is not greater than BPP of each of first, second, and third native laser beams 705A-705C.

As shown in FIG. 7A, combined layer beam 707 can include interleaved light 709A from first laser source 702A, light 709B from second laser source 702B, and light 709C from third laser source 702C. Interleaved light 709A, light 709B, and light 709C may be arranged in a pitch. By selectively pass and reflect each of first, second, and third native laser beams 705A-705C, gaps in first, second, and third native laser beams 705A-705C can be covered by one another because of their angle difference, thereby minimizing the gaps in combined laser beam 707 and its far-field spots thereof (not shown). In some embodiments of the present disclosure, the gaps in combined laser beam 707 and its far-field spots thereof may be eliminated, and interleaved light 709A, light 709B, and light 709C interface or overlap with each other, which increases the combined laser beam's power density, while not increasing the combined laser beam's diameter and/or BPP compared with each of first, second, and third native laser beams 705A-705C.

Figure 7B:
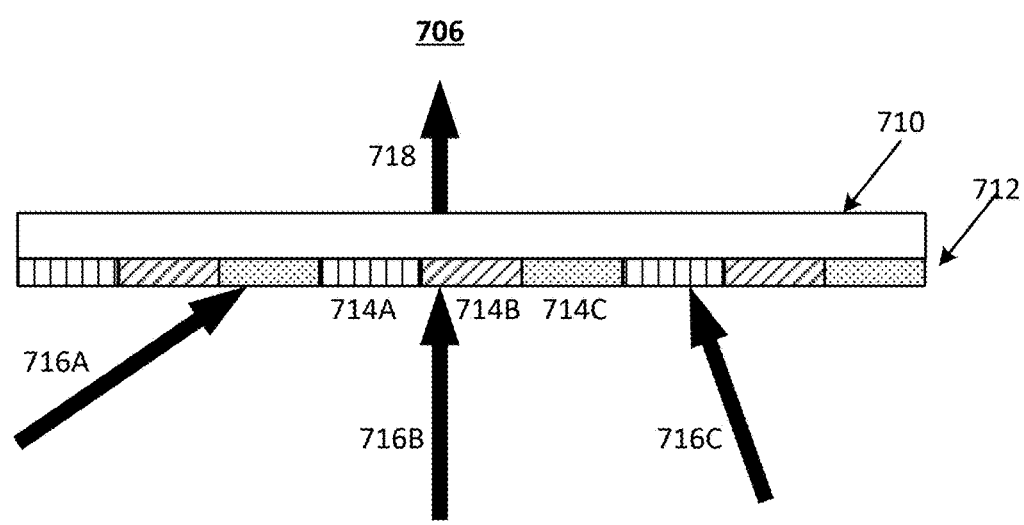
FIG. 7B illustrates a schematic diagram of another exemplary light modulator in the transmitter of FIG. 7A, according to embodiments of the disclosure.

FIG. 7B illustrates a schematic diagram of an exemplary light modulator 706 in transmitter 700 of FIG. 7A, according to embodiments of the disclosure. As shown in FIG. 7B, light modulator 706 may include a transparent substrate 710 and a diffractive optical element (DOE) layer 712 on transparent substrate 510, which includes three interleaved patterns 714A, 714B, and 714C. Light modulator 706 may be arranged in any suitable way with arbitrary incident angles between each incident direction 716A, 716B, or 716C and transparent substrate 710. A diffraction direction 718 may perpendicular to or in any suitable angle with transparent substrate 710.

Transparent substrate 710 may be transparent to the wavelengths of each of first, second, and third native laser beams 705A-705C, i.e., allowing the light to pass through. In some embodiments of the present disclosure, transparent substrate 710 includes, but not limited to, glass, quartz, and plastic. DOE layer 712 can include interleaved three different patterns 714A-714C that are spaced part in a same pitch. The pitch of DOE patterns 714A-714C may determine the pitch of interleaved light from different laser sources in the far-field spots of combined laser beam 707 in FIG. 7A. In some embodiments of the present disclosure, DOE patterns 714A-714C may include at least one of a reflective pattern, a transmissive pattern, and a diffractive pattern. In the example shown in FIG. 7B, DOE patterns 714A-714C are reflective pattern, transmissive pattern, and diffractive pattern, respectively. The configuration of DOE patterns 714A-714C in DOE layer 712 (e.g., types, pitch, number, etc.) may be determined based on the incident angles of each of first, second, and third native laser beams 705A-705C with respect to light modulator 706. In some embodiments, the incident angles between each of the incident directions of first, second, and third native laser beams 705A-705C and transparent substrate 710 are different from one another, which is different from the example shown in FIG. 5B. It is understood that DOE-based light modulators (e.g., 706) and DOE-based arbitrary incident beam interleaving approach described in FIGS. 7A-7B are not limited to three laser sources and three native laser beams thereof, and can be expanded to more than three laser sources and three native laser beams thereof.

Referring back to FIG. 2, scanner 210 may be configured to emit combined laser beam 209 to an object 212 in a first direction. Scanner 210 may scan object 212 using combined laser beam 209 combined and modulated by light modulator 208, which has minimized gaps between the light, within a scan angle at a scan rate. Object 212 may be made of a wide range of materials including, for example, non-metallic objects, rocks, rain, chemical compounds, aerosols, clouds and even single molecules. The wavelength of combined laser beam 209 may vary based on the composition of object 212. At each time point during the scan, scanner 210 may emit combined laser beam 209 to object 212 in a direction within the scan angle. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 216. Lens 214 be configured to collect light from a respective direction in its field of view (FOV). At each time point during the scan, returned laser beam 211 may be collected by lens 214. Returned laser beam 211 may be returned from object 212 and have the same wavelength as combined laser beam 209.

Photodetector 216 may be configured to detect returned laser beam 211 returned from object 212. Photodetector 216 may convert the laser light (e.g., returned laser beam 211) collected by lens 214 into an electrical signal 218 (e.g., a current or a voltage signal). The current is generated when photons are absorbed in the photodiode. In some embodiments of the present disclosure, photodetector 216 may include avalanche photodiode (APD), such as a single photon avalanche diode (SPAD), a SPAD array, and a silicon photo multiplier (SiPM).

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A transmitter for light detection and ranging (LiDAR), comprising:

a plurality of laser sources, each comprising interleaved emitting regions and first gaps and configured to provide a native laser beam in a respective incident direction; and a light modulator configured to receive the native laser beams from the plurality of laser sources in different incident directions and combine the native laser beams into a combined laser beam in a diffraction direction, wherein the light modulator comprises:

reflective regions comprising light reflection elements on a transparent substrate, respectively, each light reflection element being coated with one or more material layers that are configured to selectively reflect the native laser beams; and transmissive regions comprising remaining regions of the transparent substrate that are not covered by the light reflection elements, wherein the transmissive regions are configured to selectively pass the native laser beams, wherein the transmissive regions and the reflective regions of the light modulator are interleaved to selectively pass and reflect each of the native laser beams such that light from a first one of the native laser beams covers second gaps in a second one of the native laser beams.

2. The transmitter of claim 1, wherein each of the laser sources is a multi-junction pulsed laser diode (PLD).

3. The transmitter of claim 2, wherein emitting regions of each multi-junction PLD are equally spaced apart by the first gaps of the multi-junction PLD.

4. The transmitter of claim 1, wherein the transmissive regions and the reflective regions of the light modulator are configured to selectively pass and reflect each of the native laser beams such that far-field spots of the combined laser beam comprise interleaved light from each of the laser sources.

5. The transmitter of claim 4,
wherein the light reflection elements are spaced apart in a first pitch.

6. The transmitter of claim 5, wherein the interleaved light from each of the laser sources is spaced apart in a second pitch determined based on the first pitch.

7. The transmitter of claim 5, wherein
the plurality of laser sources comprise a first laser source configured to provide a first native laser beam in a first incident direction, and a second laser source configured to provide a second native laser beam in a second incident direction perpendicular to the first incident direction, and
an incident angle between each of the first and second incident directions and the transparent substrate is 45°.

8. The transmitter of claim 7, wherein the one or more material layers are coated on a top surface of the light reflection element.

9. The transmitter of claim 7, wherein the diffraction direction is parallel to the second incident direction and perpendicular to the first incident direction.

10. The transmitter of claim 1, further comprising a plurality of collimators each configured to project light from the emitting regions of a respective laser source into the respective incident direction with third gaps inbetween.

11. The transmitter of claim 1, wherein a diameter of the combined laser beam is not greater than a diameter of any of the native laser beams.

12. The transmitter of claim 1, wherein a beam propagation product (BPP) of the combined laser beam is not greater than a BPP of either of the native laser beams.

13. A transmitter for light detection and ranging (LiDAR), comprising:
a first multi-junction pulsed laser diode (PLD) configured to provide a first native laser beam in a first incident direction;
a second multi-junction PLD configured to provide a second native laser beam in a second incident direction perpendicular to the first incident direction; and
a light modulator comprising:
reflective regions comprising light reflection elements on a transparent substrate spaced apart in a first pitch, wherein each of the light reflection elements is coated with one or more material layers that reflect the first and second native laser beams; and
transmissive regions comprising remaining regions of the transparent substrate that are not covered by the light reflection elements, wherein the transmissive regions are configured to selectively pass the first and second native laser beams,
wherein the transmissive regions and the reflective regions of the light modulator are interleaved to selectively pass and reflect each of the first and second native laser beams such that light from the first native laser beam covers first gaps in the second native laser beam and light from the second native laser beam covers second gaps in the first native laser beam, and far-field spots of a combined laser beam generated by the first and second native laser beams comprise interleaved light from each of the first and second multi-junction PLDs.

14. The transmitter of claim 13, wherein the interleaved light from each of the first and second multi-junction PLDs is spaced apart in a second pitch determined based on the first pitch.

15. The transmitter of claim 13, wherein an incident angle between each of the first and second incident directions and the transparent substrate is 45°.

16. The transmitter of claim 13, wherein the one or more material layers are coated on a top surface of the light reflection element.

17. The transmitter of claim 13, wherein the combined laser beam is parallel to the second incident direction and perpendicular to the first incident direction.

18. The transmitter of claim 13, further comprising a couple of collimators each configured to project light from the first and second multi-junction PLDs into the respective incident direction with third gaps inbetween.

19. The transmitter of claim 13, wherein a diameter of the combined laser beam is not greater than a diameter of either the first or second native laser beam.

20. The transmitter of claim 13, wherein a beam propagation product (BPP) of the combined laser beam is not greater than a BPP of either the first or second native laser beams.

* * * * *